June 30, 1970     E. R. BROWN     3,517,720
PNEUMATIC TIRE

Filed April 29, 1969     4 Sheets-Sheet 1

INVENTOR.
ELLSWORTH R. BROWN
BY Steward & Steward
his ATTORNEYS.

June 30, 1970  E. R. BROWN  3,517,720
PNEUMATIC TIRE

Filed April 29, 1969  4 Sheets-Sheet 2

INVENTOR
ELLSWORTH R. BROWN

BY *Steward + Steward*

*his* ATTORNEYS.

INVENTOR
ELLSWORTH R. BROWN

June 30, 1970  E. R. BROWN  3,517,720
PNEUMATIC TIRE
Filed April 29, 1969  4 Sheets-Sheet 4
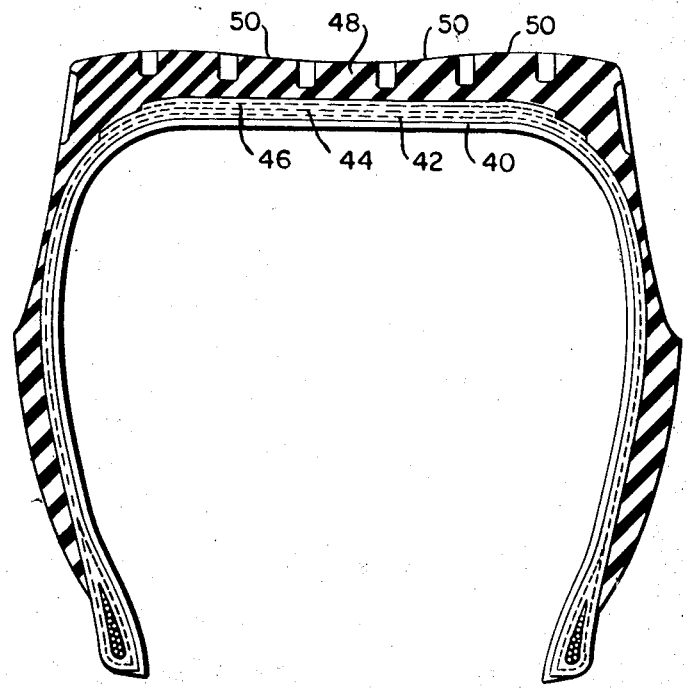
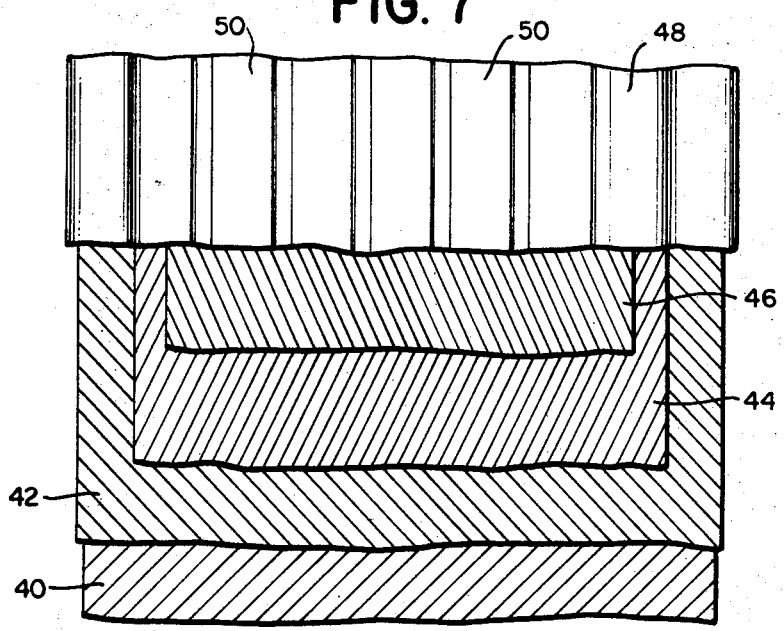
INVENTOR
ELLSWORTH R. BROWN
BY Steward & Steward
his ATTORNEYS.

United States Patent Office 3,517,720
Patented June 30, 1970

3,517,720
PNEUMATIC TIRE
Ellsworth R. Brown, Branford, Conn., assignor to The Armstrong Rubber Company, West Haven, Conn., a corporation of Connecticut
Continuation-in-part of application Ser. No. 660,503, Aug. 14, 1967. This application Apr. 29, 1969, Ser. No. 826,767
Int. Cl. B60c 3/00, 11/00
U.S. Cl. 152—352                10 Claims

ABSTRACT OF THE DISCLOSURE

A pneumatic tire construction having a wide tread in which the load on the tire is more uniformly distributed over the entire area of contact between the tire and road surface due to an ox-bow shaped profile of the tread when molded, and to the manner in which the tire is constructed and molded in order to make it take the desired shape when inflated.

---

This application is a continuation-in-part of my co-pending application Ser. No. 660,503, filed Aug. 14, 1967.

The invention relates to pneumatic tires, and it relates more particularly to tires which provide better traction because of greater and more uniform contact between the tire and the road.

Efforts are continuously being made in the tire industry to improve the traction of tires in all kinds of weather without drastically increasing the rate at which the tire wears and without increasing the noise produced by the tire when in use. One way in which this can be done is to increase the amount and uniformity of contact which a tire of a particular size makes with the road when it is under load. Such contact, including the uniformity with the load carried by the tires is distributed over the area of contact, is measured by the so-called "footprint" of each particular tire, which is made under laboratory conditions as is well understood in the industry. The footprint of conventional bias-ply tires has been characterized by a bowing inward of the line of contact of the tire with the roads at the shoulders of the tire. This bowing-in produces a slight hour-glass shape in the footprint, which noticeably reduces the total area of contact as compared with a footprint which is straight or bowed outwardly along the shoulder.

Recently the trend in the tire industry has been toward increasing the width of the tread with respect to the width of the cross-section of the inflated tire at its widest point from sidewall to sidewall. In this way the footprint can be substantially increased in size and area, but in many cases at the expense of a highly undesirable increase in the rate of tread wear under all types of driving conditions. Furthermore, simply increasing the width of the tread of a tire by a given amount does not necessarily improve the traction of the tire by a corresponding amount. Thus, unless the tread is fully engaged with the road across its entire width and the load carried by the tire is distributed uniformly throughout the area of contact, improvement in the so-called wet and dry traction of the tire will not be as much as might be expected, or as much as could be obtained. On the other hand, traction in mud and snow or on ice involves quite a different problem from that of providing traction in starting, stopping and cornering on dry or wet highways. It is the latter conditions to which the present invention is directed.

An object of the invention is to provide a tire with a wide tread which makes better contact with the road when loaded, in order to substantially improve traction between the tire and the road surface.

I have discovered a particular combination of mold configuration and tire construction which produces a tire having much better distribution of load over the area of contact between the tire and road for any particular size of tire than has been feasible heretofore. Furthermore, the actual area of contact is increased. In addition, tires embodying the present invention retain the advantages of bias-ply tires, including ease of manufacture and improved stability at all speeds at which the vehicle is driven. The invention resides in combining the following elements of construction:

(1) The carcass has a plurality of body plies which extend from bead to bead, the cord angle of each ply being such that the outside diameter of the tire when inflated is substantially the same as when the tire is molded.

(2) The tread surface is molded with a cross-sectional profile in which the central portion of the tread is concave and the portions on both sides thereof are convex, so that the profile of the tread looks like an ox-bow with a wide central depression tapering smoothly into the convex portions, the high points of which are located about 55% to 75% of the distance from the equatorial center-line of the tire to each shoulder.

(3) The diameter of the molded tire at the centerline of the tread is substantially the same as the diameter at each shoulder, and the difference between the diameters of the tire at the shoulder and a the high points on the convex portions of the tread profile is a predetermined dimension which is obtained more or less empirically for each particular type and size of tire. It is also desirable to construct and mold the tire so that the ratio of the section height to the cross-sectional width of the tire as molded is greater than such ratio when the tire is inflated.

Tires built in accordance with the foregoing arrangement have a much larger footprint area than conventional bias-ply tires, and have been found to engage the road with substantially more uniform pressure throughout the area of contact, not only when the tire is new, but during its entire tread life. While some rounding-off of the tread at the shoulders has been observed due to cornering of the vehicle, this does not noticeably reduce the footprint area of the tire so that improved traction is maintained. In addition, due to the more uniform distribution of the load in the footprint area, the tread wears move uniformly across the full width of the tire than is true of prior attempts to increase the tread width with respect to the cross-sectional width of the tire. Furthermore, a highly desirable combination of greatly improved wear and traction has resulted from the addition of circumferential fiber glass belts over the body or carcass plies in the tread area of the tire.

A difference of considerable commercial importance between the relatively recent radial-ply tire and the more conventional bias-ply tire is the ease with which the bias-ply tire can be built as compared with radial-ply tires. Furthermore, since radial-ply tires require costly special equipment and considerably more time to build, it is a distinct advantage from a manufacturing standpoint to make tires on conventional tire-building equipment available for bias-ply tires. Radial-ply tires, however, can not be built with such equipment. Tires embodying the present invention have been found at least to equal radial-ply tires in most respects performancewise but provide much better traction and are much easier to manufacture.

These and other advantages and objects of the invention will become more apparent from the detailed disclosure hereinafter of certain tire constructions embodying the invention, reference being had to the accompanying drawings wherein:

FIG. 6 is a cross-section through a belted tire; and

FIG. 7 is a plan view similar to FIG. 2 but of a belted tire.

Figure 1:
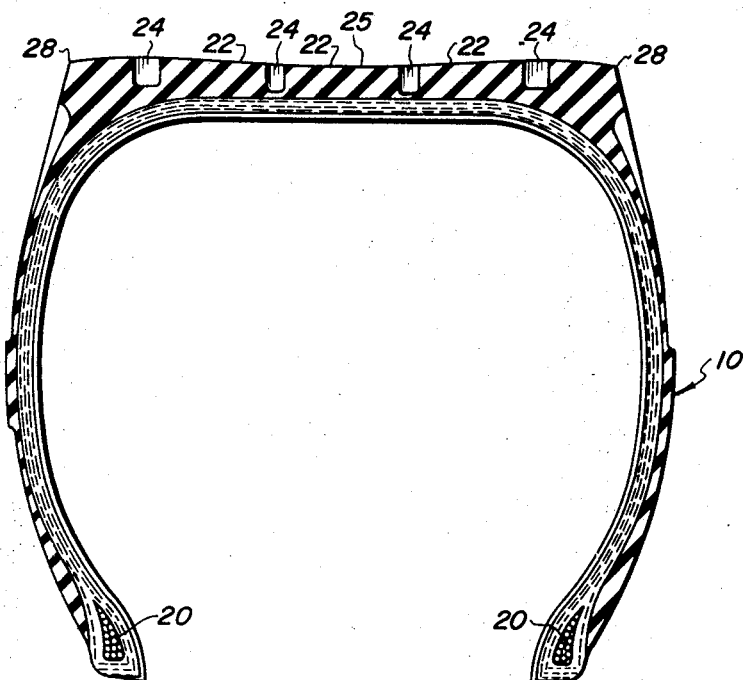
FIG. 1 is a view in cross section through a non-belted tire casing embodying the invention as it appears in the mold.
Figure 2:
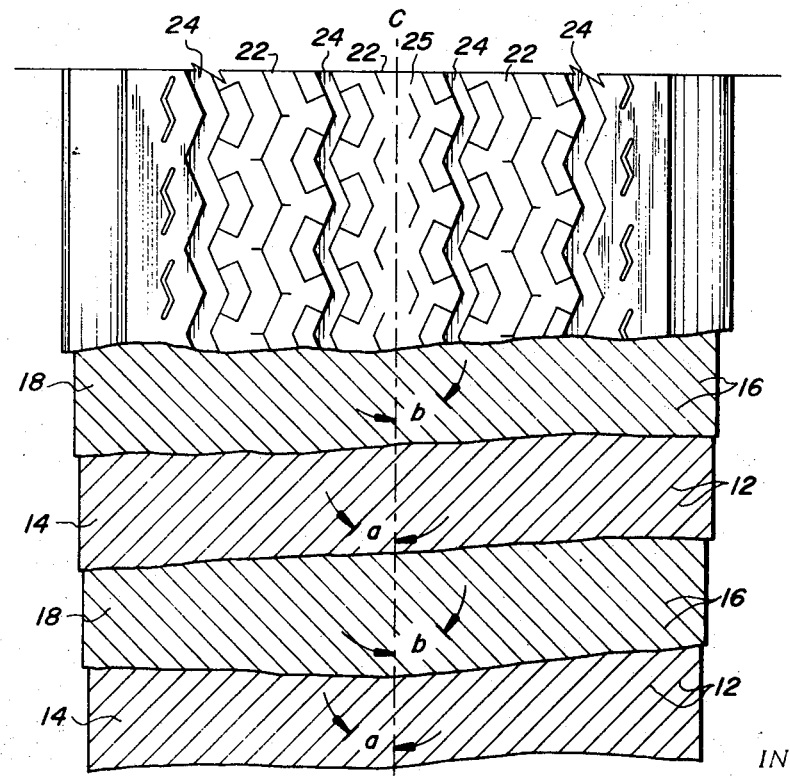
FIG. 2 is a plan view of a section of a tire casing shown in FIG. 1 with portions of the tire casing broken away to show the arrangement of the cord plies.

Referring to FIGS. 1 and 2 the basic construction of the tire is generally smilar to the conventional bias-ply tire, in which the carcass consists of one or more rubberized body-plies with the cords running obliquely to the equatorial plane or center-line of the tire and alternating with an equal number of plies in which the cords run transversely thereof at the same angle to, but on the opposite side of, the center-line. For example, in the four-ply tire 10 shown, the cords 12 of the plies 14, 14 intersects the equatorial plane represented by the line C—C at an angle $a$, and the cords 16 of the other two plies 18, 18 intersect the plane C—C at an equal, but opposite, angle $b$. The body plies 14 and 18 extend down the sidewalls of the tire and are wrapped around the beads 20, 20 in the usual manner. In addition, the surface of the tread is preferably provided with conventional circumferentially extending ribs 22 which are separated by grooves 24, a central rib 25 being located on the equatorial center-line of the tire. Breaker plies or belts as shown in FIGS. 6 and 7 may also be included if desired.

Figure 3:
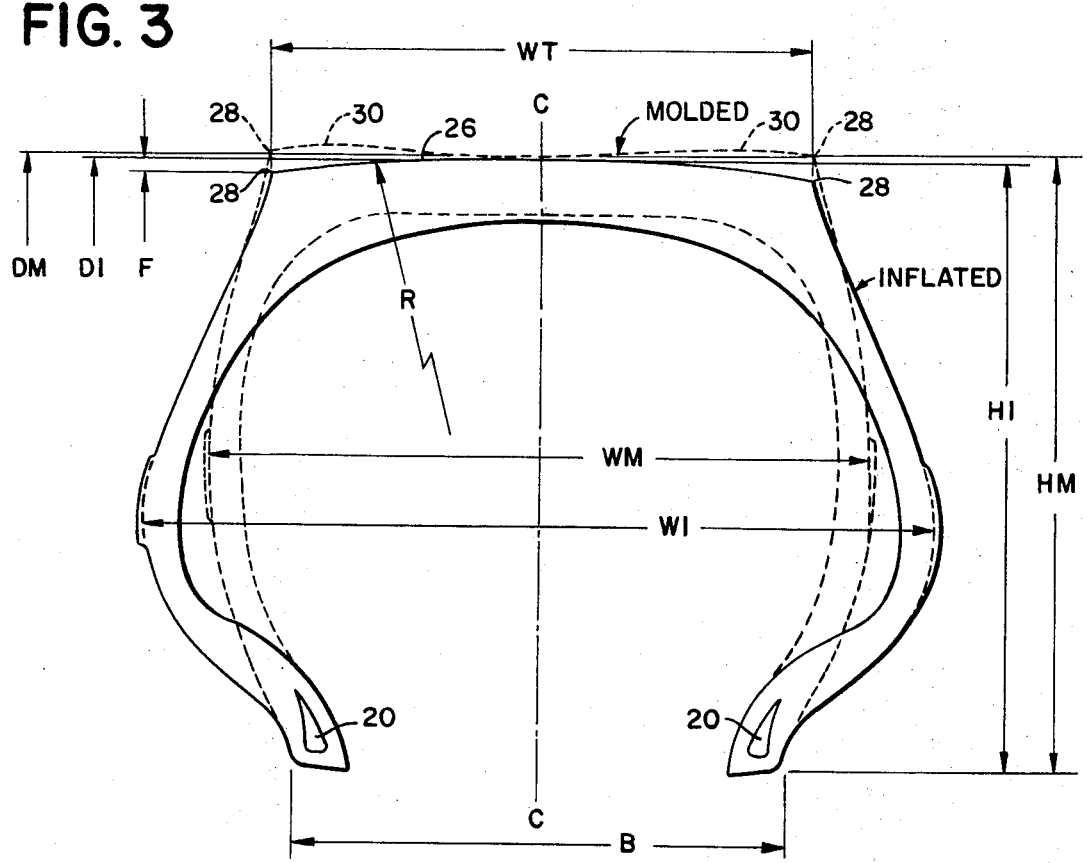
FIG. 3 is a schematic view of the tire in cross section, showing in broken lines the shape of the tire in the mold and in solid lines the approximate shape it takes when mounted on a rim (not shown) and inflated to the recommended pressure.

As illustrated in FIG. 3 the outer surface of the tire as molded is shown exaggerated and in broken lines, the grooves 24 in the tread and other details being omitted for the sake of clarity. When the tire is removed from the mold, mounted on a rim and inflated to the desired pressure, the cross-section of the tire changes in shape as indicated in full lines in FIG. 3. The section width WM of the tire as molded is the dimension from the outermost portion of one sidewall surface (excluding any raised ribs or ridges in the surface of the sidewall) to the outermost portion of the opposite sidewall. Because the sidewalls of the tire are flexible when the tire is not inflated, the section width WM is most readily measured at the corresponding inner surfaces of the tire mold rather than on the tire itself. The section width WI of the inflated tire is the corresponding dimension when the tire has been inflated to the pressure for which it is designed. The diameter of the tire on the equatorial plane C—C in the tire when molded is designated in FIG. 3 by the reference character DM, the corresponding diameter of the inflated tire being designated DI. The bead width B is measured between the outer edge of each of the beads 20, 20 and in this instance is equal to the width of the rim on which the tire is mounted when inflated. In this connection it will be understood that while the specific tires here illustrated are to be mounted on rims having standard Tire and Rim Association (TRA) measurements for designated sizes, the invention may be employed in tires designed for mounting on other rims as well, so long as the diameter of the rim is within acceptable tolerances of the designated rim size of the tire.

Virtually all tires of modern design are molded so that the tread surface or profile 26 (FIG. 3) is convex when the tire is inflated, forming an arc having a so-called crown radius R, the center of which is located on the equatorial plane C—C. The ratio of the crown radius R to the inflated section width WI of the tire, known as the flatness ratio, is important in designing a tire because this ratio helps determine how evenly the load carried by the tire is distributed over the footprint area of contact between tire and road. Theoretically the tread profile of the inflated tire should be as flat as possible in order to distribute the load evenly across the full width of the tread and to prevent flexing of the tread. In practice, however, it has not been possible to distribute the load evenly across a perfectly flat tread because of the manner in which the load is transmitted to the tread by the sidewalls, in comparison with the load transmitted to the tread by the pressure of the air within the tire and because of the placement of the tread stock as well as other factors which must be taken into consideration in the construction of a good tire. Since the sidewalls provide more support to the shoulder areas of the tread while the central part of the tread is supported almost entirely by the air in the tire, it is necessary in order to obtain even load distribution to have the tread form an arc when the tire is inflated. It has been found that by employing the present invention, the flatness ratio of the radius R to the inflated section width WI can be obtained which is well in excess of 2. This is a distinct advantage because the higher the flatness ratio the less flexing the tread is subjected to as it is continuously flattened and bent on going into and out of contact with the road. However, as will be more fully explained hereinafter, the present invention provides other advantages and therefore is not limited to tire constructions which produce a flatness ratio in excess of 2.0 even though this is desirable in most cases.

Referring o FIG. 3, the tread surface 26 intersects the sidewalls of the tire at shoulders 28, 28, which define the tread width WT, the shoulders 28, 28 desirably being sharp in this instance, in order to obtain as wide a footpring as possible. However, it will be understood that even if the shoulders are rounded, tires constructed in accordance with the present invention still provide greatly improved road contact over conventional tires and considerably better wear than other, so-called wide-track tires that have been developed theretofore. Moreover, due to cornering of the tires in use, it is inevitable that the shoulders of the tire will become rounded to a certain extent. Nevertheless, because of the way in which the tires of the present invention are constructed and molded, they provide much greater traction even after the shoulders have become rounded than previous tires of corresponding size and tread width.

It will be understood by those skilled in the art that greater traction during highway driving in wet or dry road conditions is provided as the width of the tread increases with respect to the section width of the carcass, so long as uniform loading of the footprint area is also provided. An advantage of the present invention is that a tread arc width may be employed which is well in excess of 70% of the inflated section width WI of the tire while at the same time distributing the load uniformly over the entire area of contact with the road. It will be understood, moreover, that this invention is directed primarily to those tires which have been identified in the industry as coming within the line of tires, in which the width of the tread is approximately 70%–75% of the section width of the inflated tire and referred to as the 70-series. However, it has been found that the invention can be used to advantage in some lines of tires which are somewhat under 70% and, therefore, where reference is made hereinafter and in the claims to the tread being in excess of about 70%, this is intended to include tires in which the tread width is somewhat less than 70% of the section width.

The section height HI (FIG. 3) of the tire is the distance from the rim at the point where the beads seat to the surface of the tread as defined by the Tire and Rim Association, this dimension being shown in FIG. 3 as taken on the full-line representation of the tire when inflated to the outside diameter (DI) of the tire. The section height (HM) of the tire as molded, while most advantageously being about the same as the inflated section height (HI), should be no more than 2% or 3% higher or lower than the inflated height. The relationship between the ratio of the section height HI to the section width WI of the inflated tire and the height-width ratio ($HM/WM$) of the tire as molded is important in producing the desired crown radius R and flatness ratio in the tire, as well as to make the shoulders of the tread move inward toward the axis of the tire when it is inflated instead of the center of the tread moving out to form the tread arc. In accordance with the present invention, the height/width ratio of the inflated tire is desirably less than the height/width ratio of the tire as molded.

Figure 4:
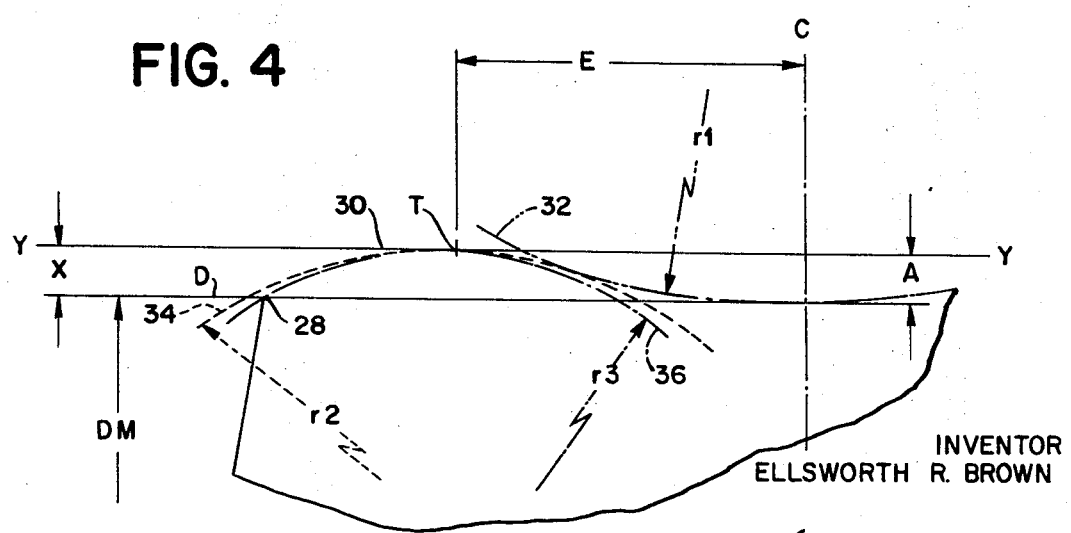
FIG. 4 is an enlarged schematic view of a portion of the tread, shoulder and sidewall of the tire as molded, showing the tread profile greatly exaggerated for illustrative purposes.

Referring now more particularly to the profile of the tread as formed in the tire mold and with reference to FIG. 4, wherein the contour or profile of the tread as molded is greatly exaggerated for purposes of illustration, the tire of the present invention is formed so that the tread is depressed at the center along the equatorial plane C—C. The curvature of this concave central portion of the tire is such that it does not extend to the shoulders 28, 28 of the tread, but blends smoothly into arcs of opposite curvature at each side of the tread to form convex sections or humps 30, 30 inward of shoulders 28, 28. This produces an ox-bow shaped cross-sectional tread profile, which is made up of several arcs that are tangent to each other so that they blend into a smooth line of reverse curvature. The depressed central portion of the tread profile consists of an arc 32 having a radius $r_1$ centered on the equatorial plane C—C. The convex section 30 of the tread on each side of the center-line is formed in this instance by two arcs 34 and 36 having radii $r_2$ and $r_3$, respectively, whose centers are disposed such that the outermost arc 36 is tangent to the arc 34 and intersects the sidewall of the tire at the shoulder 28. Shoulders 28, 28, on the other hand, are located at the same level radially of the tire as the diameter DM of the tire at the center of the tread. Consequently, the difference $x$ between radius of the tire at the shoulder 28 and at the high point T on the convex section 30 of the tread is equal to the amount by which the tread is depressed at the center of the tread. In FIG. 4 an imaginary horizontal line Y—Y is drawn tangent to the convex section 30 of the tread at T in order to show the relationship of the shoulder 28 and central depression A in the tread, this being an important distinction between the present invention and prior attempts to improve tire performance by depressing the profile of the tread, such as that disclosed in the present to Taylor 1,846,042, for example.

It will be understood of course that the tread is symmetrical in most respects, including the profile, on both sides of the center-line. With the position of shoulders 28, 28 determined by the tread width and the diameter DM of the tire at the center, radii $r_1$ and $r_2$ are selected such that the required depression A is provided at the center of the tread and the high point T of each of the convex sections 30 is located a desired distance E from the center-line C—C of the tire. In practice it has been found that the distance E should be from about 55% to about 75% of the distance from the center-line C—C to the shoulders 28, 28. The centers of the radii $r_2$ and $r_3$ are shifted by trial and error until: (1) either of the arcs 34 or 36 is tangent to the horizontal line Y—Y at T, (2) the arcs 32 and 34 are tangent to each other and (3) the arc 36 intersects the shoulder 28. In some instances the arc 34 will satisfy all three of these conditions by intersecting the shoulder 28 when made tangent to both the line Y—Y and the concave arc 32. In such cases the arc 36 is of course eliminated, and the ox-bow profile is formed entirely by the central arc 32 of radius $r_1$ and the arc 34 of radius $r_2$ forming each of the convex sections 30 of the tread.

The set dimension A, representing the depth of the central depression in the tread, and the transverse location of the convex sections 30, 30 are determined more or less empirically for each size and type of tire in order to produce the greatest traction and least tread wear. Once these dimensions are found, the shape of the tread surface to be molded into the tire is arrived at in the manner just described.

As seen in FIG. 3 the diameter of the tire at the center-line of the tread remains nearly the same when the tire is inflated, the shoulders 28, 28 dropping down to form the tread arc. The provision of the convex sections 30, 30 in the tread where the greatest amount of deflection occurs during inflation not only prevents stretching of the tread rubber in the shoulder areas of the tread, but also provides more uniform pressure per unit area throughout the footprint of the tire. This is in distinct contrast to other tires, such as that shown in the hereinbefore-mentioned Taylor Pat. No. 1,846,042 where the full width of the tread is depressed from shoulder to shoulder when molded. Tires having tread profiles molded in this manner do not provide as good traction and stability as tires embodying the present invention. Moreover, such prior designs drastically increase the rate of tread wear.

It should be noted that depending on the results of the empirical determination as to where the convex sections or humps 30 should be located on either side of the equatorial center-line C—C of the tread, these humps may be nearer the center in some tires than in others. It is believed, however, that humps 30 should be within 55% to 75% of the distance from the center of the tread to the shoulder, or in other words that the dimension E is equal to 55% to 75% of one-half the tread width WT. Where it is determined that humps 30, 30 should be relatively near the center of the tread then, in order to distribute the load on the tire uniformly across the treads it becomes necessary to make the tread-arc or crown radius R of the inflated tire less than in those where the humps 30, 30 should be located further away from the center of the tread.

Pertinent dimensions in inches taken from actual test tires embodying the present invention are given in Tables I and II below. Dimensions for inflated tires were taken from tires inflated to 24 p.s.i.g. and averaged from measurements of tires in lots of one hundred of the same specifications. The tires of Table I were all of the so-called non-belted type which do not include an inextensible belt under the tread portion of the tire. The carcass of these tires, moreover, were constructed as shown in FIGS. 1 and 2 of four bias-plies, which extended from bead to bead, and did not include breakers. The crown angles $a$ and $b$ of the carcass plies 14 and 18 were between 28° and 32°. However, it will be understood of course that two bias-plies with or without breakers can be employed if desired. The flatness ratio of the tires given in Table I ranged from just below 2.0 to about 2.2, depending on the size.

TABLE I

| Tire size | Section width | | Radii of tread profile | | | Concavity A | Dimension E | OD at ℄ | | Tread arc width WT | Section height | |
|---|---|---|---|---|---|---|---|---|---|---|---|---|
| | Mold WM | Inflated tire WI | $r_1$ | $r_2$ | $r_3$ | | | Mold DM | Inflated tire DI | | Molded HM | Inflated HI |
| 7.75-14 | 6.80 | 7.91 | 17 | 9 | 7 | 0.080 | 1.99 | 26.70 | 26.64 | 5.61 | 6.35 | 6.32 |
| 8.25-14 | 6.98 | 8.56 | 17 | 9 | 7 | 0.080 | 2.02 | 27.34 | 27.15 | 6.11 | 6.67 | 6.575 |
| 8.55-14 | 8.00 | 9.03 | 18 | 16 | 8 | 0.080 | 2.08 | 27.54 | 27.48 | 6.48 | 6.77 | 6.74 |
| 8.15-15 | 7.04 | 8.14 | 17 | 9 | 7 | 0.080 | 2.00 | 27.47 | 27.39 | 6.11 | 6.235 | 6.195 |
| 8.85-15 | 7.61 | 9.06 | 18 | 16 | 8 | 0.080 | 2.11 | 29.36 | 29.19 | 6.48 | 7.18 | 7.095 |
| 9.15-15 | 7.82 | 9.41 | 18 | 11 | 6.75 | 0.100 | 2.44 | 29.76 | 29.68 | 7.00 | 7.38 | 7.34 |
| 8.90-15 | 8.02 | 9.50 | 18 | 16 | 8 | 0.080 | 2.36 | 29.76 | 29.54 | 7.00 | 7.38 | 7.27 |

When the tires from which data of Table I was taken were inflated, the shoulder of each tire dropped from about 0.30 to 0.45 inch (dimensions F of FIG. 3) below the outside diameter of the tire, thus evidencing the remarkably long crown radius of such tires. It will also be noted from Table I that for the test tires included therein, the set dimension A for the amount of concavity at the center of the tread ranged from 0.080 to 0.100 inch, most of the passenger car tire sizes having a set dimension of .080 inch. However, in truck tires, the dimension A may be about 0.125 inch and in the large sizes may run as high as 0.40 inch. The radius $r_1$ employed to produce the concavity in the molded tires in the examples given in Table I was 17 to 18 inches, but in the larger tread tires sizes, $r_1$ may be nearly 25 inches. It will also be noted from Table I that the tread width WT of the tires given therein is approximately 70% to about 75% of the section width of the inflated tire WI, and that the dimension E, which locates the position of the humps 30 laterally of the tread, is from 64% to 72% of the distance from the center to the shoulder.

Table II gives similar data for tires of the so-called bias-ply belted type illustrated in FIGS. 6 and 7, in which the present invention is employed. The tire shown in FIGS. 6 and 7 is provided with two full carcass plies 40 and 42 extending from bead to bead. The cords of the carcass plies are desirably made of nylon and form a crown angle of about 32° with the circumferential center-line of the tire. In addition, a pair of reinforcing bands or belts 44 and 46 are provided outside the carcass ply 42. The cords of belts 44 and 46 are made of glass fibers and are embedded in an elastomeric material, said cords being disposed at a crown angle of 26° with the circircumferential center-line. The tread 48 of the tire is formed in this instance with seven circumferential ribs 50, the edges of which may be saw-toothed or straight as shown. The cord angles of the carcass plies may be within a preferred range of 28° to 34° with respect to the equatorial plane of the tire at the crown, while the cords of the fiber glass belts form a crown angle within a range of from 24° to 28° in the cured tire. Tires embodying the construction and molding technique of the present invention and which also are provided with fiber glass belts as described hereinabove have remarkable wearing quality as well as traction and general roadability.

The cords of the belts 44 and 46 may be formed of other relatively non-extensible materials, such as wire, so long as good adhesion is obtained between the rubber and the cords, while those of the carcass plies both in the belted and non-belted tires may be any of the conventional materials such as nylon or rayon. The flatness ratio of the tires for which data is given in Table II is about 1.6, which is less than that for the tires of Table I. This is due to the fact that the dimension E is only about 57% of the distance from the center of the tread to the shoulder.

TABLE II

| Tire size | Section width | | Radii of tread profile | | | Concavity A | Dimension E | OD at ℄ | | Tread arc width WT | Section height | |
|---|---|---|---|---|---|---|---|---|---|---|---|---|
| | Mold WM | Inflated tire WI | $r_1$ | $r_2$ | $r_3$ | | | Mold DM | Inflated tire DI | | Molded HM | Inflated HI |
| E70-14 | 7.02 | 7.78 | 11.12 | 3.82 | 3.82 | 0.100 | 1.71 | 25.885 | 25.95 | 6.02 | 5.94 | 5.973 |
| F70-14 | 7.28 | 7.95 | 11.13 | 4.26 | 4.26 | 0.100 | 1.76 | 26.32 | 26.41 | 6.20 | 6.16 | 6.205 |
| G70-14 | 7.65 | 8.60 | 11.59 | 4.495 | 4.495 | 0.100 | 1.86 | 26.94 | 27.00 | 6.54 | 6.47 | 6.50 |
| G70-15 | 7.48 | 8.39 | 12.08 | 4.25 | 4.26 | 0.100 | 1.83 | 27.66 | 27.77 | 6.43 | 6.33 | 6.385 |
| H70-15 | 7.84 | 8.86 | 12.28 | 4.41 | 4.41 | 0.110 | 1.90 | 28.26 | 28.345 | 6.69 | 6.63 | 6.673 |

It will again be noted that the tread width WT of each tire in Table II is in excess of 70% of the inflated section width WI, ranging in this respect from 75% to 78%.

Figure 5:
FIG. 5 is a footprint of a tire embodying the invention.

FIG. 5 shows a reproduction of an actual footprint taken from a size 8.55 x 14 tire manufactured in accordance with the present invention similar to that shown in FIGS. 1 and 2, the dimensions of which are given in Table I. The tire was placed under a load of 1580 lbs. at 26 p.s.i.g. inflated pressure. It will be noted that the shoulders of the tread engage the surface along a straight line, rather than being bowed inwardly as in the case of most prior tire designs. This means that the shoulders of the tire are not being drawn inward in the area of the engagement between the tread and the road. Inward movement of the shoulders causes the tread in these areas to squirm laterally of the tread while in contact with the road in what is commonly referred to as "squeegeeing" back and forth causing heat to build up in the shoulder areas of the tread, so that the shoulders wear more rapidly than the central portion of the tread. This squeeze action is eliminated in the present tires because the shoulders run in a straight line. Consequently, the shoulders of the tire run cooler on the road and do not wear as rapidly as in tires where the tread bows inward when in contact with the road under a load.

What is claimed is:

1. A pneumatic tire construction comprising in combination,
   a toroidal-shaped carcass having spaced beads and a plurality of cord plies extending from bead to bead and a tire tread,
   said tread having well-defined shoulder portions at each side thereof, the width of said tread being in excess of about 70% of the section width of the inflated tire, the surface of said tread when molded having a cross-sectional contour or profile, the central portion of which is concave and comprises an arc of predetermined radius centered on the equatorial plane of the tire, said tread profile further having adjacent each shoulder a convex section of predetermined curvature, the outside diameter of the tire measured at each shoulder being substantially equal to the outside diameter of the tire at the center of the tread, the points of tangency of a straight line tangent to both said convex sections of said tread profile being located from about 55% to about 75% of the way from the center-line of the tread to each shoulder, the amount of concavity at the center of the tread for tires of the same specifications being a set dimension, said tire being constructed and molded such that when it is inflated its outside diameter on the equatorial plane is not substantially greater than the outside diameter of the tire as molded, while the diameter of the inflated tire at each shoulder is less than the corresponding diameter of the tire as molded.

2. A tire construction as defined in claim 1 wherein the outside diameter of the inflated tire on the equatorial plane is less than the corresponding diameter of the tire as molded, the ratio of the section height to the section width of the inflated tire being less than said ratio in the tire as molded.

3. A tire construction as defined in claim 2 wherein said beads of the molded tire are spaced the same distance apart as they are when mounted on a rim and inflated.

4. A tire construction as defined in claims 1 or 2, wherein said points of tangency on the tread profile of the tire as molded are located from 64% to 72% of the distance from the center-line of the tread to their respective shoulders and the flatness ratio of the tire is greater than 2.0.

5. A tire construction as defined in claim 1 wherein each of said convex sections of said tread profile is formed by a curve comprising a second arc of predetermined radius which is tangent to the arc of said concave central portion and of reverse curvature with respect thereto.

6. A tire construction as defined in claim 5, wherein each of said convex sections of said tread profile includes a third arc of predetermined radius which is tangent to said second arc and of similarly directed curvature and which intersects the shoulder of the tire adjacent thereto.

7. A tire construction as defned in claim 5, wherein said second arc forms each of said convex sections and intersects the shoulder adjacent thereto.

8. A tire construction as defined in claim 2, wherein the set dimension of concavity between the convex sections of the tread profile is between 0.080 and 0.110 inch in tires for mounting on rims which have 14 to 15 inch nominal bead diameters.

9. A tire construction as defined in claim 1, wherein said cord plies comprise a pair of bias plies extending from bead to bead and a pair of reinforcing belts disposed between said tread and said bias plies, said belts being composed of glass fiber cords embedded in an elastomeric material.

10. A tire construction as defined in claim 9, wherein said point of tangency on the tread profile of the tire as molded are located approximately 57% of the distance from the centerline of the tread to their respective shoulders and the flatness ratio of the tire is substantially 1.6.

References Cited

UNITED STATES PATENTS 3,410,329  11/1968  Bezbatchenko _____ 152—352

FOREIGN PATENTS 361,542  4/1938  Italy.
6509760  7/1965  Netherlands.

ARTHUR L. LA POINT, Primary Examiner

C. B. LYON, Assistant Examiner

U.S. Cl. X.R.

152—209